United States Patent [19]

Takada

[11] 4,323,267

[45] Apr. 6, 1982

[54] PASSIVE VEHICLE SEAT BELT SYSTEM

[76] Inventor: Juichiro Takada, 3-12-1 Shinmachi Setagayaku, Tokyo, Japan

[21] Appl. No.: 135,993

[22] Filed: Mar. 31, 1980

[30] Foreign Application Priority Data

Mar. 29, 1979 [JP] Japan .................. 54-039999[U]

[51] Int. Cl.³ .............................................. B60R 21/02
[52] U.S. Cl. .................................... 280/803; 280/807
[58] Field of Search .............................. 280/801–808

[56] References Cited

U.S. PATENT DOCUMENTS

| 3,872,895 | 3/1975 | Takada | 139/383 R |
| 3,931,988 | 1/1976 | Oehm et al. | 280/802 |
| 4,189,170 | 2/1980 | Tanaka | 280/807 |
| 4,213,637 | 7/1980 | Mauron | 280/804 X |
| 4,218,076 | 8/1980 | Compeau | 280/807 X |

Primary Examiner—Joseph F. Peters, Jr.
Assistant Examiner—Randall A. Schrecengost
Attorney, Agent, or Firm—Brumbaugh, Graves, Donohue & Raymond

[57] ABSTRACT

A passive belt system comprises a shoulder belt leading from a retractor inboard of the seat to an anchor on the upper rear corner of the door and a waist belt leading from a retractor outboard of the seat to a buckle affixed to the shoulder belt at an intermediate point which is inboard of the occupant when the door is closed.

8 Claims, 3 Drawing Figures

PASSIVE VEHICLE SEAT BELT SYSTEM

FIELD OF THE INVENTION

This invention relates to an improvement in passive belt systems of the type in which a shoulder belt is moved between a restraining position and a releasing position in response to the opening and closing movement of the door.

BACKGROUND OF THE INVENTION

A simple and effective passive occupant restraint system for vehicles that is now available in some automobiles consists of a shoulder belt that leads diagonally upwardly and outwardly from a retractor on the inboard side of the seat to an anchor at the upper rear corner of the door and an energy-absorbing knee pad under the vehicle dashboard in front of the seat occupant. Even though the knee pad affords the seat occupant a relatively high degree of safety, some people may feel unsafe or insecure with only a shoulder belt and desire more restraint, especially when driving on rough roads. Also, some people prefer a more secure system for normal or average driving conditions.

SUMMARY OF THE INVENTION

There is provided in accordance with the present invention an improvement in a passive vehicle occupant restraint system of the type having a shoulder belt that leads from a retractor affixed adjacent the lower rear of the inboard side of the vehicle seat upwardly and outwardly across the seat to an anchor adjacent the upper rear corner of the vehicle door. The system preferably includes an energy-absorbing knee pad in front of the vehicle seat for protecting the lower part of the seat occupant's body in a collision. Accordingly, the system, as described thus far, is known to those skilled in the art. The improvement involves the provision of a waist belt which leads from a retractor located adjacent the lower rear of the outboard side of the seat, at least when the vehicle door is closed, and a releasable coupling for connecting the free end of the waist belt to a point on the shoulder belt which is located adjacent the inboard side of the seat when the shoulder belt is in the restraining position. The releasable coupling is, preferably, a buckle and a companion buckle tongue. The waist belt retractor can be affixed to the vehicle door adjacent the lower rear corner, or it can be affixed to the seat or to the vehicle floor adjacent the lower rear of the outboard side of the seat. In either case when the door is closed, the waist belt leads across the seat occupant's lap to the coupling point where it is joined to the shoulder belt so that when the waist belt is connected to the shoulder belt the belt system is of the type often called a three-point system.

The present invention, accordingly, fulfills the desires of vehicle occupants who prefer a greater degree of restraint than is afforded by a shoulder belt. At the same time, an occupant who may not wish to use a waist belt can leave the waist belt disconnected. When the waist belt retractor is mounted on the door and the waist belt is connected up, the occupant can enter or leave the vehicle without disconnecting the waist belt, and this arrangement lends itself reasonably well to use as a full three-point passive system, particularly if provision is made for shifting the inboard part of the shoulder belt forwardly and upwardly when the door is opened, such as by passing the shoulder belt through a guide on the upper end of a pivotable arm that pivots forward when the door is opened and rearward when the door is closed. The alternative waist belt arrangement in which the waist belt retractor is affixed within the vehicle requires that the waist belt coupling be disconnected before the occupant can enter or leave the vehicle. Accordingly, the alternative is perhaps less desirable, though it is nonetheless entirely feasible and useful.

The waist belt may be made of the type of webbing which elongates substantially under a high load in the event of a collision or may have one or more loops sewn into it with tear-away stripping. Such extensible belts absorb energy during an initial part of the duration of an impact when the occupant is thrown forward. Reference may be made to present applicant's pending U.S. Application Ser. No. 115,783 filed Jan. 28, 1980, and now abandoned, entitled "Seat Belt System Using Lap Belt Having Energy Absorption Capacity" for a description of restraint systems employing energy-absorbing, extensible waist belts.

For a better understanding of the invention, reference may be made to the following description of exemplary embodiments taken in conjunction with the figures of the accompanying drawings.

DESCRIPTION OF THE EMBODIMENTS

Figure 1:
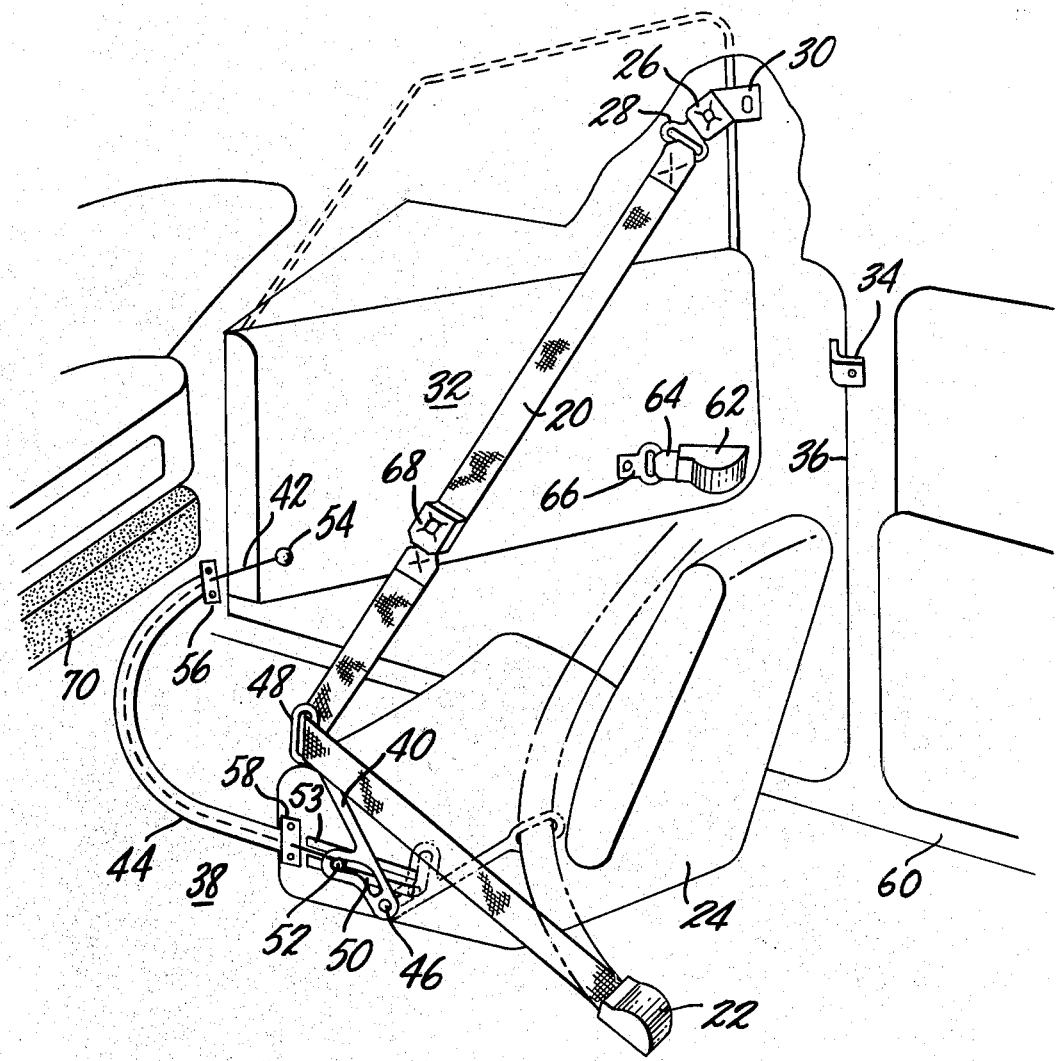
FIG. 1 is a pictorial view of a restraint system embodying the present invention and showing the system in the releasing configuration with the vehicle door open.
Figure 2:
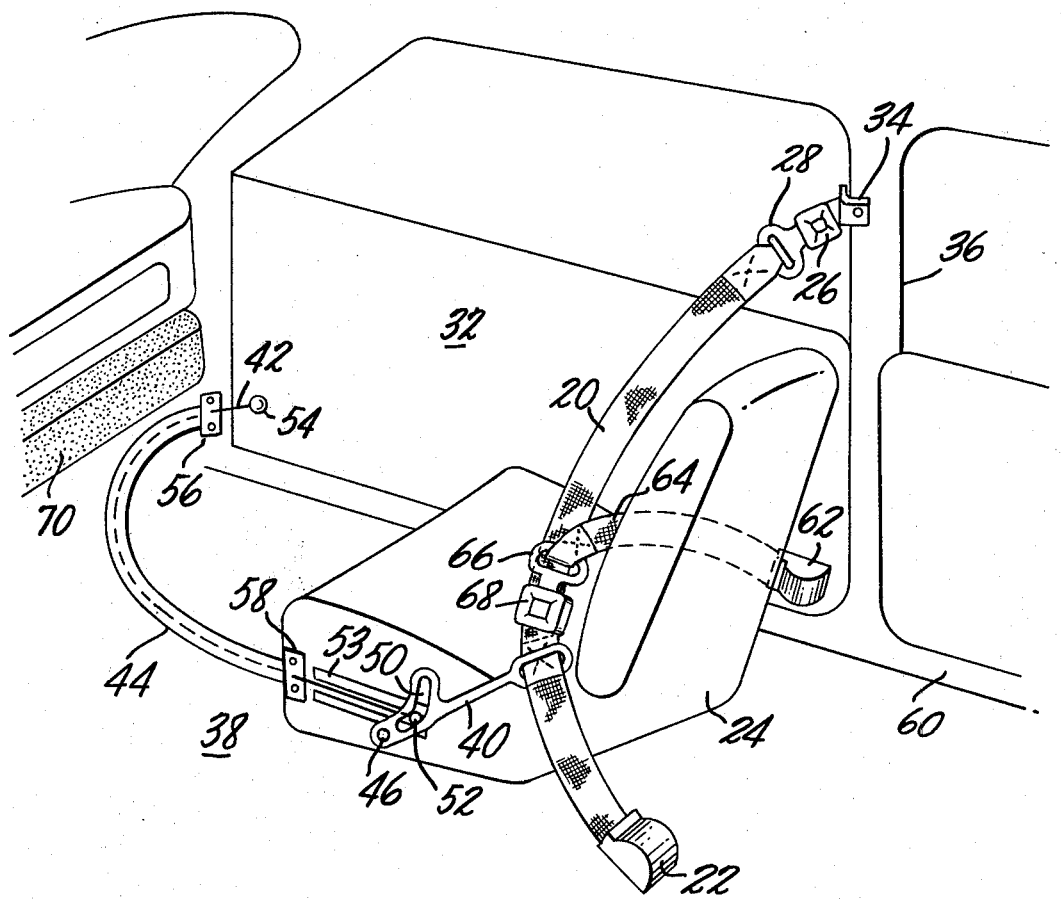
FIG. 2 is a pictorial view of the system shown in FIG. 1 illustrating it in the restraining configuration.

The passive belt system shown in FIGS. 1 and 2 includes a shoulder belt 20 that leads from a belt retractor 22 (preferably an emergency locking type) located adjacent the lower rear of the inboard side of the vehicle seat 24 diagonally upwardly and outwardly across the seat. An emergency release buckle 26 and a mating buckle tongue 28 connect the outboard end of the restraint belt 20 to an anchor plate 30 on the upper rear corner of the vehicle door 32. When the door 32 is closed, the anchor plate 30 mates with a reinforcing bracket 34 mounted on the door frame 36 and provided for the purpose of strengthening the anchor point against the high load exerted on the belt 20 in a collision.

To facilitate entry and departure by an occupant when the vehicle door 32 is opened, there is a motion transfer arrangement 38 which includes an arm 40, a drive wire 42, and a drive wire sheath 44. The arm 40 is rotatably mounted by a pivot pin 46 on the inboard side of the seat and has a guide ring 48 located on its upper end through which the restraint belt 20 passes. A generally V-shaped slot 50 in the arm 40 receives a pin 52 to which one end of drive wire 42 is connected, and the other end of the wire 42 is connected to a terminus 54 on the vehicle door 32. Brackets 56 and 58 on each end of the drive wire sheath 44 are provided to establish a constrained path for the drive wire for transfer of door motion from the door 32 to the arm 40. One bracket 56 is mounted on the car body 60 near the door frame 36 and adjacent the terminus 54 for the drive wire, while the other bracket 58 is mounted on the seat 24 adjacent the arm 40.

As the door 32 is moved from closed toward part way open, the drive wire 42 is pulled by the door through the sheath 44, thereby pulling the pin 52 towards the adjacent bracket 58. Until the lower part of the slot moves past the vertical, the door motion is transmitted to the arm, but thereafter the door motion from part way to fully open is "lost" as the pin slides forward along the upper part of the slot. The motion transfer arrangement 38 is described and shown in greater detail in applicant's pending U.S. Application Ser. No. 118,841 filed Feb. 5, 1980, and entitled "Belt Transfer Arrangement for a Passive Vehicle Restraint Belt System." When the door 32 is closed, the arm 40 is restored to the position shown in FIG. 2 by the reverse of the above process.

It should be noted that the motion transfer arrangement 38 may be replaced by other mechanisms suitably adapted to move the restraint belt 20 between the driver restraining and releasing positions in response to motion of the door.

A second belt retractor 62 is affixed on the door 32 adjacent the lower rear corner, and a waist belt 64 leads the retractor 62 and can be connected by means of a buckle tongue 66 on its free end to a buckle 68 located on the intermediate portion of the restraint belt 20. (Alternatively, in a reversal of parts, the waist belt 64 may carry a buckle that mates with a buckle tongue affixed to the shoulder belt 20.)

The waist belt 64 is attached to the diagonal or over-the-shoulder restraint belt 20 when the person is in the seat 24 and the diagonal belt 20 is in the restraining position by drawing the waist belt 64 out of its retractor 62 and connecting the buckle tongue 66 to the buckle 68. When the occupant desires to leave the seat, the waist belt 64 may be either left attached to the shoulder belt or for greater ease of departure can be disconnected by hand or by an electrically operated buckle release.

Figure 3:
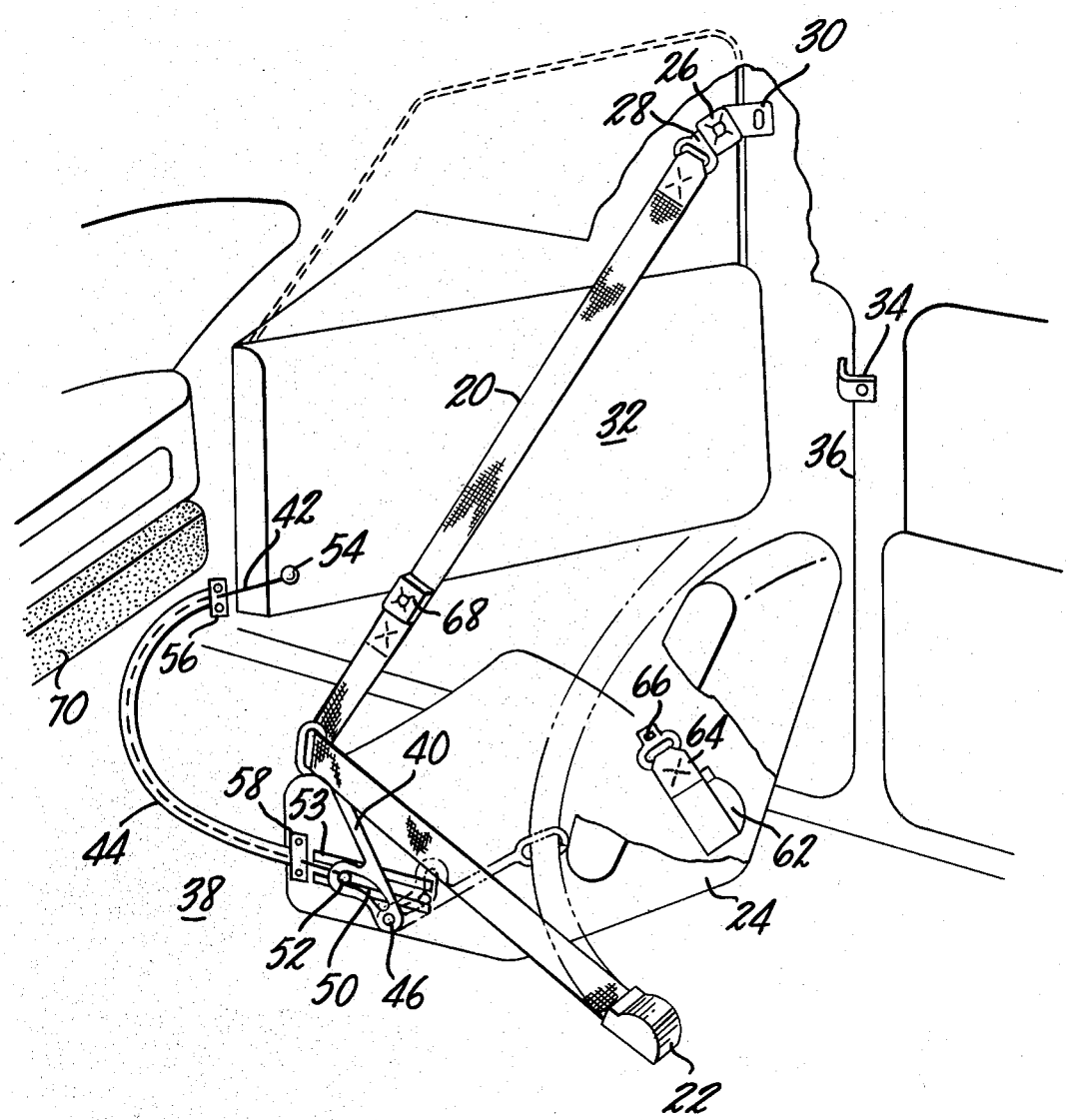
FIG. 3 is a pictorial view of another embodiment of the present invention.

Instead of affixing the second retractor 62 on the door, the retractor 62 can, as shown in FIG. 3, be affixed within the vehicle adjacent the lower rear of the outboard side of the seat, either directly to the seat frame, to the floor adjacent the seat or to the lower end of the center pillar. The structure and mode of operation of this embodiment are, for the most part, identical to that of the embodiment of FIGS. 1 and 2, and the same reference numbers are applied to the drawings. Unlike the embodiment of FIGS. 1 and 2, the waist belt 64 must be disconnected from the shoulder belt 20 before the occupant can leave the vehicle.

As an additional measure of safety, it is desirable to provide padding for the knees in the form of an energy-absorbing knee pad 70 located beneath the dashboard in front of the seat 24.

In summary, it can be seen that the addition of the waist belt is a significant improvement over the known shoulder belt and knee pad system. The occupant who desires the feeling of more secure belt restraint can, at will, do up the waist belt. Similarly, the waist belt can be used when the vehicle is travelling on a rough road and the occupant needs waist restraint to keep his seat more easily. Finally, the system can be used without doing up the waist belt, should the occupant so wish. Thus, versatility is a special advantage of the invention.

The above-described embodiments of the invention are merely exemplary, and numerous variations and modifications will be readily apparent to those skilled in the art without departing from the spirit and scope of the invention. All such variations and modifications are intended to be included in the scope of the invention, and in the claims.

I claim:

1. A passive vehicle occupant restraint system comprising a first emergency locking belt retractor affixed adjacent the lower rear of the inboard side of the vehicle seat; a shoulder belt leading from the first retractor upwardly and outwardly across the seat and fastened to the upper rear corner portion of the door and thus being adapted to shift between a restraining position when the door is closed and a releasing position when the door is opened; coupling receiving means secured to the shoulder belt at a location such that it is located adjacent the rear of the inboard side of the seat when the shoulder belt is in the restraining position; a second emergency locking retractor affixed adjacent the lower rear of the outboard side of the seat, at least when the vehicle door is closed; a waist belt wound onto the second retractor; and coupling means on the waist belt for releasably connecting the waist belt to the coupling receiving means on the shoulder belt while the shoulder belt remains connected between the first retractor and the vehicle door.

2. A restraint system according to claim 1 and further comprising means for detachably fastening the shoulder belt to the upper rear portion of the vehicle door.

3. A restraint system according to claim 1 or claim 2 and further comprising an arm pivotably mounted adjacent the inboard side of the seat and having a guide ring at the upper end through which the shoulder belt freely passes, and means responsive to opening and closing motions of the door for pivoting the arm between a restraining position adjacent the rear of the seat when the door is closed and a releasing position adjacent the front of the seat when the door is open.

4. A restraint system according to claim 1 or claim 2 wherein the coupling receiving means is a buckle and the connecting means is a buckle tongue connected to the free end of the waist belt.

5. A restraint system according to claim 1 or claim 2 wherein the second retractor is affixed to the vehicle door adjacent the lower rear corner thereof.

6. A restraint system according to claim 1 or claim 2 wherein the second retractor is affixed within the vehicle adjacent the lower rear of the outboard side of the seat.

7. A restraint system according to claim 1 or claim 2 wherein the waist belt is extensible so that the lower portion of the body of the seat occupant moves forward and some of the energy exerted on the occupant's body is absorbed by the waist belt.

8. A restraint system according to claim 1 or claim 2 and further comprising an energy-absorbing knee pad installed forward of the vehicle seat for protecting the lower part of the vehicle occupant's body upon forward movement thereof.

* * * * *